July 11, 1972   SHIGEHIRO KOMORI ET AL   3,675,999
PHOTOCOPYING APPARATUS PROVIDED WITH ORIGINAL INVERTING DEVICE
Filed May 6, 1970   6 Sheets-Sheet 1

United States Patent Office 3,675,999
Patented July 11, 1972

3,675,999
PHOTOCOPYING APPARATUS PROVIDED WITH ORIGINAL INVERTING DEVICE
Shigehiro Komori, Kawasaki-shi, and Hiroyuki Hattori, Tokyo, Japan, assignors to Canon Kabushiki Kaisha, Tokyo, Japan
Filed May 6, 1970, Ser. No. 34,927
Claims priority, application Japan, May 10, 1969, 44/35,949
Int. Cl. G03b 27/62
U.S. Cl. 355—8                                        8 Claims

ABSTRACT OF THE DISCLOSURE

A photocopying machine with a reciprocating original carrier and a slit exposure system of this invention provides a device for inverting an original so as to copy both sides of the original on one copy paper in a single copying operation.

---

The present invention relates generally to a photocopying machine and more particularly a photocopying machine with a reciprocating original carrier and a through-slit exposure system, which machine is further provided with a device for inverting an original to be copied so that both sides thereof may be copied upon a single copy paper in one copying operation.

A typical prior art original inverting device for the photocopying machine of the type described above is such that the original holder is carried by a rotary shaft at a mid-portion thereof in the direction of the movement for exposure. When one side of the original is copied, the original holder is rotated through 180° about the rotary shaft so that the other side of the original is copied. Since the original holder must be rotated about the rotary shaft, the optical system including an illumination light source, etc. must be arranged away from the path of the original holder below the original carrier. This means that the design of a photocopying machine is limited and the machine becomes bulky in size. Furthermore, there is another distinct defect in that even though the original may be automatically inverted so as to permit the reproduction of both sides thereof, one photocopying operation is required for reproducing one side of the original so that two operations are required to copy both sides as in the case of a conventional photocopying machine having no original inverting device.

It is therefore one of the objects of the present invention to provide an improved electrophotocopying machine which can copy both sides of an original to be copied in one copying operation.

It is another object of the present invention to provide an electrophotographic copying machine of the type described which can copy both sides of the original upon the same surface of a single copy paper.

It is a further object of the present invention to provide an improved electrophotographic copying machine of the type having a reciprocable original carrier and an optical system for affording an exposure through a slit, which machine can copy both sides of an original to be copied upon one surface of a single copy paper in one copying operation.

It is a still further object of the present invention to provide an improved electrophotographic copying machine having a reciprocable original carrier and an optical system for affording an exposure through a slit, which machine can invert an original to be copied immediately after one side thereof has been copied so that the other side may be copied upon the same single copy paper upon which is copied the first side of the original.

In brief, the present invention provides an improved electrophotographic copying machine having a reciprocable original carrier and an optical system for affording an exposure through a slit and is characterized by the provision of a device for inverting an original to be copied upon the original carrier, both sides of the original being copied in the return-exposure stroke of the original carrier upon a single copy paper.

The above and other objects, features and advantages of the present invention will become more apparent from the following illustrative embodiment of the present invention taken in conjuncton with the accompanying drawings, in which.

FIGS. 5, 6, 7, 8, 9, 10 and 11 are schematic side views illustrating the original inverting device with the original carrier respectively in starting position, in the going stroke when the original is being inverted (FIG. 6), when the original is completely inverted (FIG. 7), and when one side of the inverted original is placed upon a ground glass of the original carrier (FIG. 8) and in the return stroke when the one side of the original is being exposed, when the original is being inverted from one side to the other side and when the original is completely inverted; and FIGS. 5–1, 5–2, 6–1, 7–1, 8–1 and 9–1 illustrate the positions of the original inverting mechanism corresponding to FIGS. 5, 6, 7, 8 and 9 respectively.

DESCRIPTION OF THE PREFERRED EMBODIMENTS

Figure 1:
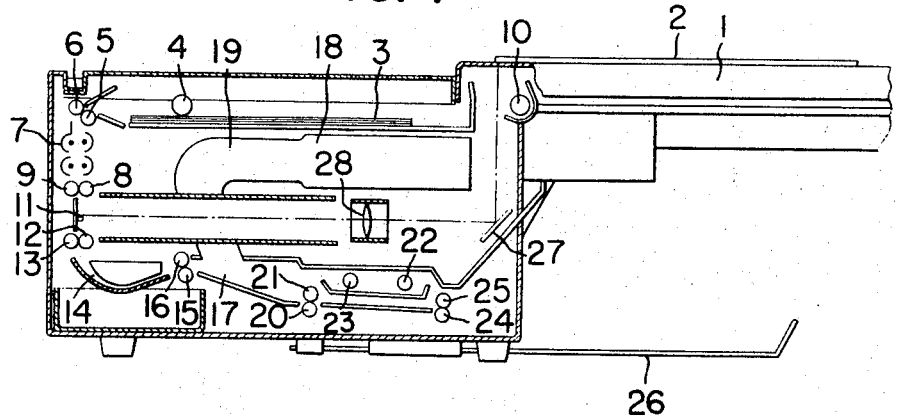
FIG. 1 is a schematic sectional view of an electrophotographic copying machine having a reciprocable original carrier and an optical system for affording an exposure through a slit to which is applied the present invention in one form.

FIG. 1 shows an electrophotographic copying machine embodying an original inverting device in accordance with the present invention. Upon a reciprocable original carrier 1 is placed an original 2 to be copied. The original carrier 1 is moved toward the left in FIG. 1 (going stroke) upon depression of a start button (not shown) and simultaneously copy paper 3 which is advanced by a feed roller 4 and rollers 5 and 6 into a charger 7 so as to be uniformly imparted with an electrostatic charge reaches a pair of feed rollers 8 and 9. At this time, the original carrier 1 reaches its end (left) of (going) stroke and a lamp 10 is turned on. The carrier immediately starts its return stroke toward the right for exposure. A light image of the original 2 is projected upon the copy paper 3 at an exposure position 11 while it is moved by the feed rollers 8 and 9 and another pair of feed rollers 12 and 13. Thereafter the copy paper 3 is admitted into an exposure station 14 where the copy paper 3 bearing thereupon an electrostatic latent image is developed. After development, the copy paper 3 is squeezed by a pair of squeeze rollers 15 and 16 and then admitted into a drying station 17 where air is introduced through a duct 19 from a blower 18, whereby the copy paper 3 may be dried.

Thereafter, the dried copy paper 3 is further advanced into a fixing station by a pair of feed rollers 20 and 21 so that the toner is fused by heaters 22 and 23 to the copy paper 3.

Thereafter, the copy paper 3 is discharged into a tray 26. The optical system for projecting a light image of the original 2 comprises a reflecting mirror 27 for changing the optical path and a projection lens 28.

Figure 2:
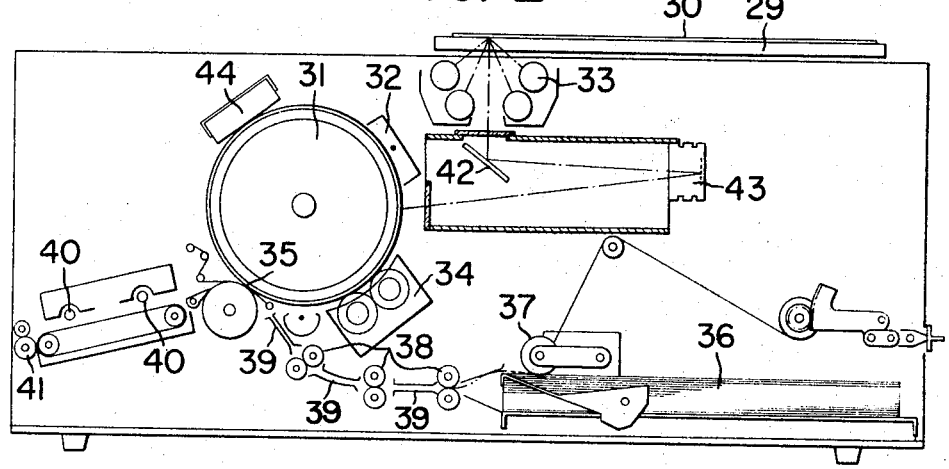
FIG. 2 is a schematic view of another type of electrophotographic copying machine to which is applied the present invention in one form.

FIG. 2 shows another electrophotographic copying machine embodying the present invention. Upon a reciprocable original carrier 29 is placed an original 30 to be copied. Upon depression of a start button (not shown), the original carrier 29 is moved toward the left (going stroke). Simultaneously a rotary photosensitive drum 31 starts its rotation so that the photosensitive layer formed upon the rotary drum 31 is uniformly imparted with the electrostatic charge by a charger 32. When the original carrier 29 reaches its end (left) of (going) stroke, a lamp 33 is turned on, the carrier 29 is immediately returned to the right (returning and exposure stroke) and simultaneously a copy paper 36 is advanced by a feed roller 37.

In a manner well known in the art, the rotary drum 31 is exposed, developed in a developing station 34 and then advanced toward an image transfer station 35. The copy paper 36 is also advanced toward the transfer station 35 along guides 39 by a plurality of pairs of feed rollers 38 which rotate in synchronization with the rotary drum 31. The toner image transferred to the copy paper 36 in the transfer station 35 is fixed to the paper 36 in a fixing station by heaters 40 and thereafter the copy paper 36 is discharged by a pair of discharge rollers 41 out of the copying machine. The optical system for exposure comprises a reflecting mirror 42 and an in-mirror lens 43. The rotary drum 31 is cleaned by cleaning means 44 for repetitive uses.

In the electrophotographic copying machines of the type described hereinabove, the present invention contemplates the provision of a device for inverting an original to be copied so that both sides of the original may be copied or reproduced.

Figure 3:
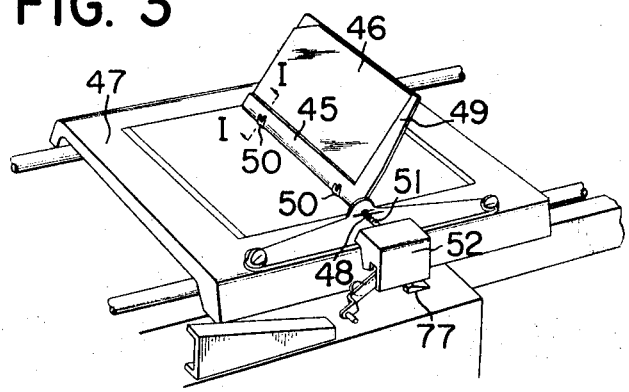
FIG. 3 is a perspective view of an original inverting device in accordance with the present invention mounted upon the original carrier of the electrophotographic copying machine shown in FIG. 1 or FIG. 2.
Figure 4:
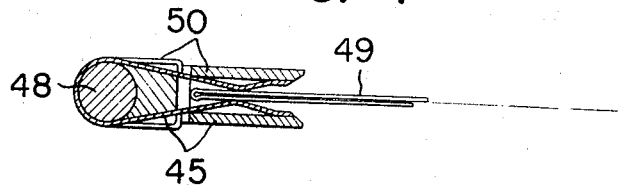
FIG. 4 is an enlarged sectional view taken along the line 1—1 of FIG. 3.

FIG. 3 shows one embodiment of an original inverting device of the type described above in accordance with the present invention.

Figure 6:
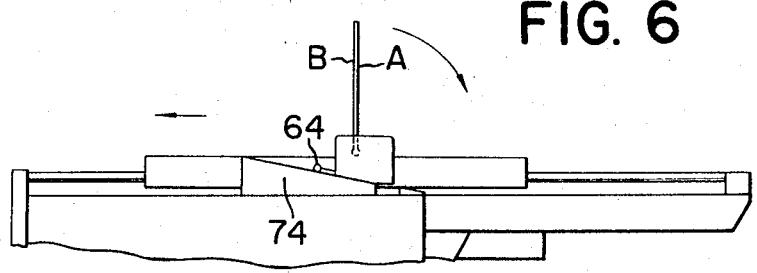
Figure 6:
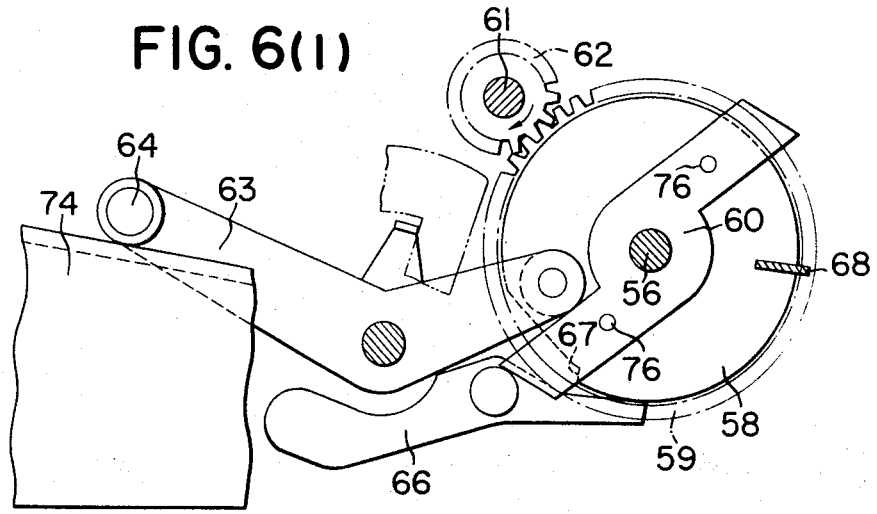
Figure 7:
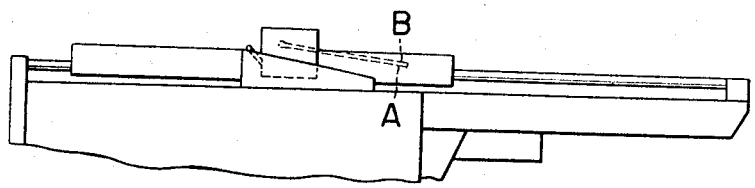
Figure 7:
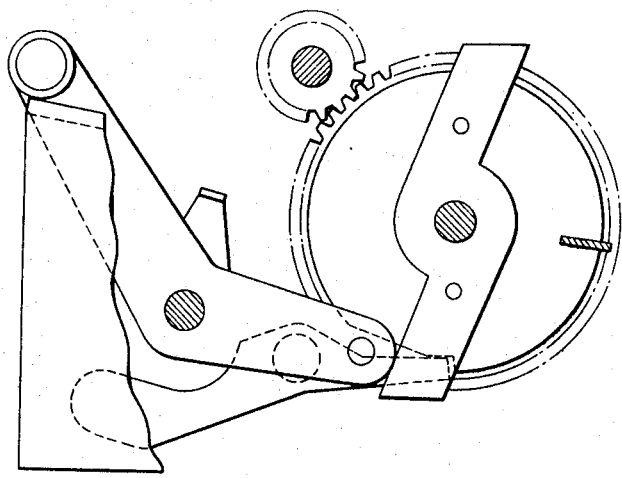
Figure 8:
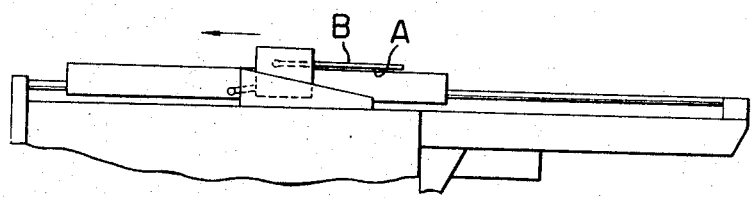
Figure 8:
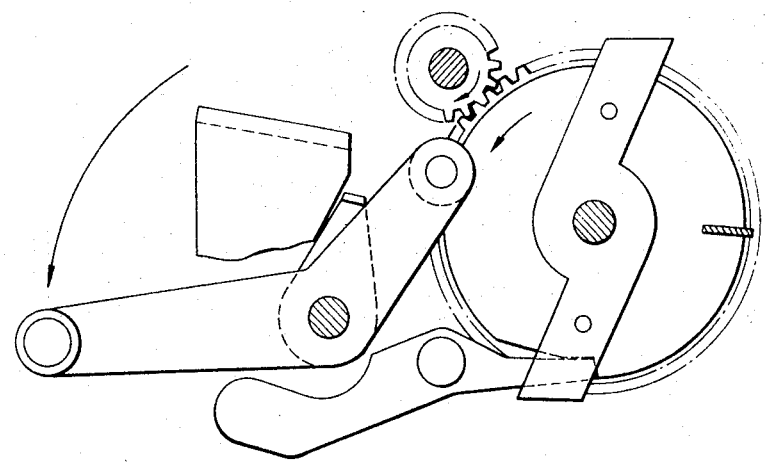
Figure 9:
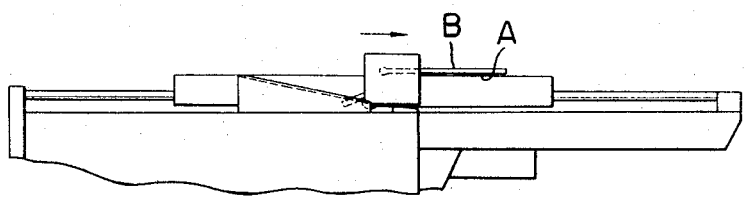
Figure 9:
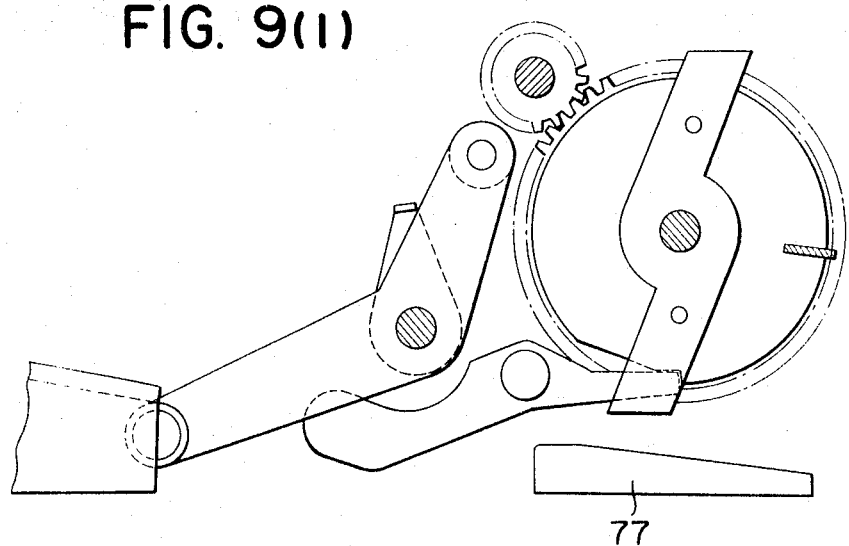
Figure 10:
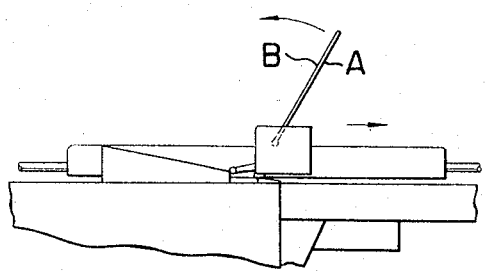
Figure 11:
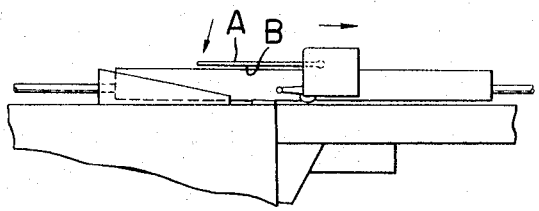

An original holder 45 of the original inverting device may be inverted through the steps illustrated in FIGS. 6–8. That is, in the going stroke of the original carrier 47, the side A of the original 46 is pressed against the original carrier 47. In the first half of the return-exposure stroke of the original carrier 47, the side A of the original 46 is copied or reproduced and immediately after the side A is copied, the original holder 46 is inverted through the steps illustrated in FIGS. 9–11 so that the side B of the original 46 may be copied in the last half of the return-exposure stroke of the original carrier 47. Thus, it is seen that both sides A and B of the original 46 may be copied upon one copy paper in one copying operation.

A lateral shaft 48 extends across the ground glass or the like of the original carrier 47 and carries securely the original holder 45 having original clipping means 49. The original 46 is inserted into the clipping means 49 and securely held in position by means of clip springs 50. A reversing or inverting spring 51 is wound around the lateral shaft 48. The spring 51 is not loaded before the original carrier 47 is reciprocated, but is gradually loaded during the going stroke. The spring 51 is loaded to the maximum when the original carrier is switched from the going stroke to the return stroke and is released during the return stroke. The mechanism for loading the spring 51 is disposed within a casing 52 and will be described hereinafter with reference to FIGS. 5, 5–1 and 5–2. Front and rear side walls 53 and 54 are held in spaced relation by means of a stay 55 and two shafts 56 and 57. The shaft 56 carries a stop wheel 58 integral with a toothed wheel 59 which is in mesh with a pinion 62 carried by a rotary shaft 61. A charge arm 63 is rotatably carried by the shaft 57 and has a roller 64 which in turn serves as a cam follower of a cam 74 (see FIG. 5) so that a rotary arm 60 carried by the shaft 56 is caused to rotate.

A pawl 66 serves to engage with a stepped portion 67 of the stop wheel 58 so that the spring 51 may be maintained in the maxium charged position when the stop wheel 58 is rotated by the charge arm 63 acting upon the rotary arm 60. The pawl 66 is actuated by the cam 77 (see FIG. 5) so that it is released from the stepped portion 67 whereby the stop wheel is released. Therefore, the rotary arm 60 is immediately returned to its initial position, and stopped by a rotary arm stopper 68 for pressing the side B of the original against the ground glass of the original carrier.

Figure 5:
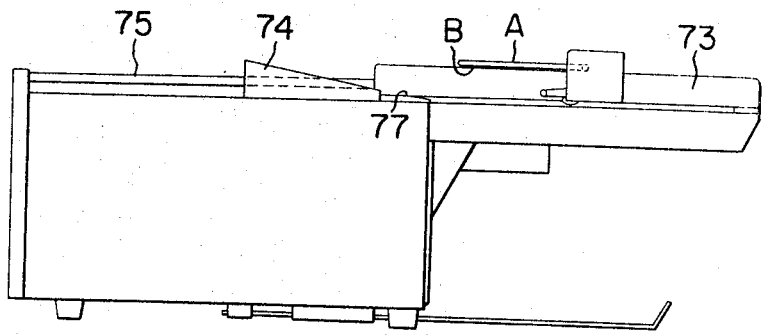
Figure 5:
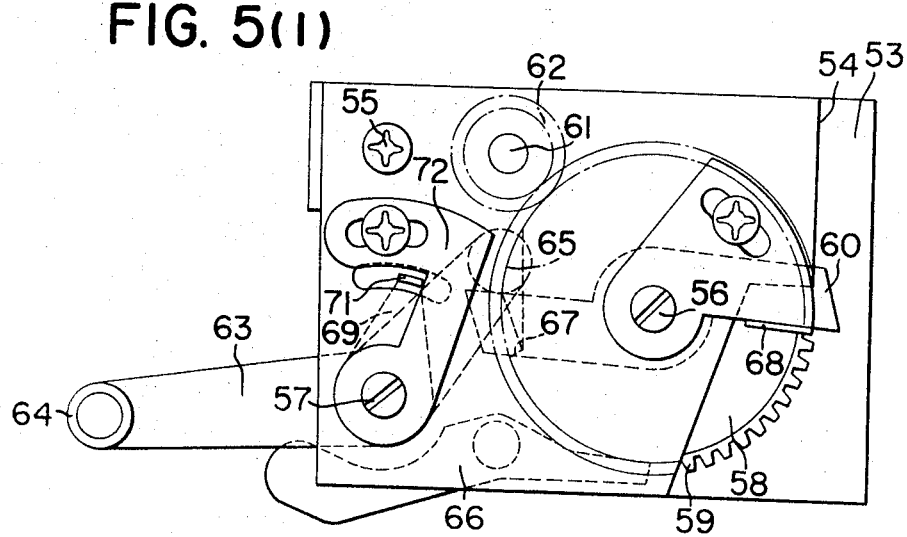
Figure 5:
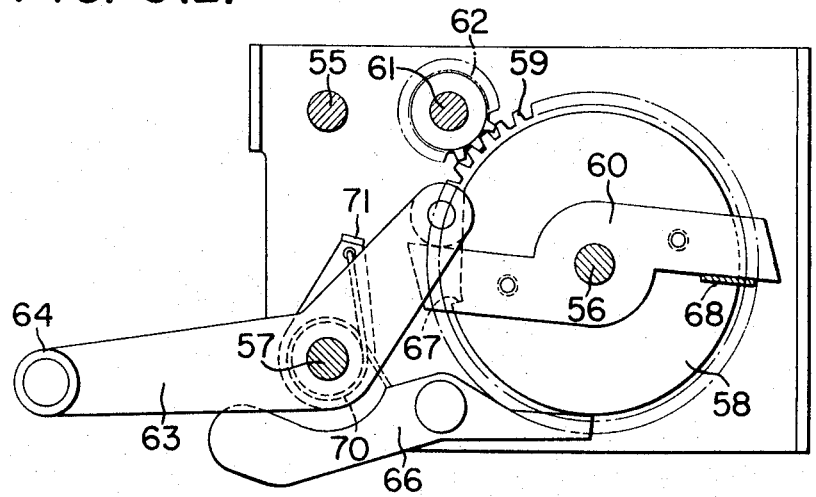

Simultaneously the charge arm is immediately returned to the initial position and held in this position by means of a stopper 69. The stopper 69 has a sprng 70 and an upright projection 71 which serves to push a charge arm 63 in the clockwise direction as shown in FIG. 5–1. Another stopper 72 serves to position the stopper 63.

In FIG. 5, the original carrier 73 is shown as being in the starting or home position and the original inverting mechanism is shown in position in FIGS. 5–1 and 5–2. That is, the shaft 61 is rotated in counterclockwise direction under the returning force of the reversing or inverting spring 51 until the rotary arm 60 intergral with the stop wheel 58 is engaged with the stopper 68, so that the side B of the original D in the original holder 45 is faced downwardly. The charge arm 63 is rotated in the counterclockwise direction until it engages with the stopper 69 so as to be actuated by the cam 74.

Upon depression of a start button, the original carrier 73 is caused to move to the left along the rails 75. When the roller 64 of the charge arm 63 rides over the cam plate 74 so as to be raised upward, the charge arm 63 is caused to rotate in a clockwise direction as shown in FIG. 6–1 so that the rotary arm 60 is caused to rotate whereby the stop wheel 58 made intergral with the toothed wheel 59 is also caused to rotate in the counterclockwise direction by means of pins 76 made integral with the rotary arm 60.

Therefore, the pinion 62, its shaft 61 and the original holder 45 are rotated as shown in FIG. 6 so as to charge the spring 51. When the roller 64 of the charge arm 63 reaches the upper end of the cam 74, as shown in FIGS. 6–1, the original holder 45 makes an inversion through an angle slightly larger than a half of one rotation as shown in FIG. 6–1 and there is produced a slight gap between the pawl 66 and the stepped portion 67 of the stop wheel 58.

When the roller 64 is moved away from the cam 74 the charge arm 63 is returned until it engages with the stopper 69 as shown in FIG. 8–1 by the return spring (not shown) while the stop wheel 58 is returned until the pawl 66 engages with its stepped portion 67 so that the side A of the original D is precisely pressed against the ground glass of the original carrier as shown in FIG. 8.

Under this condition, the original carrier 47 reaches the end of the going stroke and then reverses itself for the returning stroke so that the side A of the original D is copied or reproduced. In the return stroke, it should be noted that the roller 64 passes under the cam plate 74.

Immediately after the side A is copied in the first half of the return-exposure stroke of the original carrier 47, the pawl 66 engages with the cam 77 so that the pawl 66 is caused to rotate about the shaft 48 in the clockwise direction whereby a stop wheel 58 is released or unlocked. Therefore, under the force of the spring 51 which has been charged in the going stroke, the original holder 45 is immediately inverted in a counterclockwise direction until the rotary arm 60 engages with the stopper 68 shown in FIGS. 5–1 and 5–2. Thus the side B of the original D is pressed against the ground glass of the original carrier 47 for exposure.

Since the return stroke of the original carrier is continued, the side B may be copied upon the same copy paper. Thereafter, the original carrier 47 returns to and stops in its initial position shown in FIG. 2.

From the foregoing, it is seen that both sides of an original may be copied upon one copy paper during one return-exposure stroke of the original carrier embodying the original inverting device of the present invention. Thus, a high-speed copying operation may be feasible. Since the original inverting device in accordance with the present invention inverts an original to be copied upon the original carrier of an electrophotographic copying machine having a through-slit exposure system, it will be readily seen that the original inverting device can be detachably mounted upon the copying machine when required.

What is claimed is:

1. In an electrophotographic copying machine comprising a housing, means for forming an electrostatic latent image including means for uniformly imparting an electrostatic charge to a photosensitive member, means for projecting a light image of an original to be copied upon said photosensitive member, means for developing said electrostatic latent image, a light source for illuminating said original, and means for reciprocating said original through the path of said light source, the improvement which comprises:

a reciprocating original carrier adapted to invert the original for copying which comprses; holding means mounted to said original carrier, means for inverting said holding means in the opposite direction with respect to movement of said carrier, said inverting means including a cam mounted to said housing adjacent to said carrier, charging means engaging said cam to charge a biasing member during movement of said carrier in one direction; and means for releasing said biasing member at a predetermined position upon return movement of said carrier to invert said holding means whereby upon return movement of said carrier, one side of said original is positioned for copying and thereafter said original is inverted to its opposite side.

2. An electrophotographic copying machine of the character described in claim 1 wherein said original holding means comprises a rotary shaft for inverting the original, an original holder carried securely by said rotary shaft, and original clipping means carried by said original holder by clip springs.

3. An electrophotographic copying machine of the character described in claim 1 wherein said means for inverting said original holding means comprises a rotary shaft for rotating said original holding means when said original carrier advanced in one direction, a reversing or inverting spring wound round said rotary shaft for imparting the force for inverting said original holding means, a mechanism for charging said reversing or inverting spring while inverting said original holding means, means for keeping said inverting spring in charged position so as to permit the exposure of one side of the original, and means for releasing said inverting spring from said charged position so as to invert said original holding means, thereby permitting the exposure of the other side of the original.

4. An electrophotographic copying machine of the character described in claim 3 wherein said inverting spring charging mechanism comprises an original rotating wheel coaxially carried by said rotary shaft, charging rotary wheel in close contact with the rotating peripheral surface of said original rotating wheel, a stop wheel and a rotary arm coaxially carried by the shaft of said charging wheel, a charge arm for causing the rotation of said rotary arm thereby charging said inverting spring, detent means for engagement with said stop wheel so as to maintain said reversing or inverting spring in charged position after the latter has been charged, a cam for engagement with said charge arm for charging said reversible or inverting spring, and a cam for releasing said detent means form said stop wheel.

5. An electrophotographic copying machine of the character described in claim 4 wherein both of said original rotating wheel and said charging wheel are toothed wheels.

6. An electrophotographic copying machine of the character described in claim 4 wherein said charge arm contacts with said charging cam and said rotary arm through rollers affixed to both ends of said charge arm.

7. An electrophotographic copying machine of the character described in claim 4 wherein said stop wheel has a stepped or notched portion with which said detent means engages.

8. An electrophotographic copying machine of the character described in claim 4 wherein said stop wheel has a raised or ridge portion with which engages said detent means.

References Cited
UNITED STATES PATENTS

| | | | |
|---|---|---|---|
| 3,381,573 | 5/1968 | Caldwell | 355—23 UX |
| 3,475,094 | 10/1969 | Kucera et al. | 355—23 |
| 3,561,865 | 2/1971 | Burdick, Jr. | 355—75 X |

SAMUEL S. MATTHEWS, Primary Examiner

R. A. WINTERCORN, Assistant Examiner

U.S. Cl. X.R.

355—23, 75